United States Patent
Han et al.

(10) Patent No.: US 12,298,990 B1
(45) Date of Patent: May 13, 2025

(54) OPTIMIZATION OF TIME-SERIES ANOMALY DETECTION

(71) Applicant: INTERNATIONAL BUSINESS MACHINES CORPORATION, Armonk, NY (US)

(72) Inventors: Si Er Han, Xi'an (CN); Xiao Ming Ma, Xi'an (CN); Xue Ying Zhang, Xi'an (CN); Jing Xu, Xi'an (CN); Ji Hui Yang, Beijing (CN); Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/524,131

(22) Filed: Nov. 30, 2023

(51) Int. Cl.
  *G06F 16/00* (2019.01)
  *G06F 16/2458* (2019.01)
  *G06F 16/28* (2019.01)

(52) U.S. Cl.
  CPC ........ *G06F 16/2477* (2019.01); *G06F 16/285* (2019.01)

(58) Field of Classification Search
  CPC .................... G06F 16/2477; G06F 16/285
  See application file for complete search history.

(56) References Cited

U.S. PATENT DOCUMENTS

| | | | |
|---|---|---|---|
| 10,453,007 B2 | 10/2019 | Chu | |
| 11,061,934 B1 * | 7/2021 | Xue | G06F 16/2237 |
| 11,146,445 B2 * | 10/2021 | Qingsong | H04L 41/0677 |
| 11,157,782 B2 * | 10/2021 | Bathen | G06N 3/044 |
| 11,768,915 B1 * | 9/2023 | Shama | G06N 20/00 707/737 |
| 11,960,254 B1 * | 4/2024 | Wu | G05B 23/024 |
| 2018/0324199 A1 | 11/2018 | Crotinger et al. | |
| 2020/0409950 A1 | 12/2020 | Qiao | |

(Continued)

FOREIGN PATENT DOCUMENTS

| | | |
|---|---|---|
| CN | 112148955 A | 12/2020 |
| CN | 112213687 B | 5/2023 |
| EP | 3672153 B1 | 3/2021 |

OTHER PUBLICATIONS

Jiang, et al., "Semi-Supervised Time Series Anomaly Detection Based on Statistics and Deep Learning", Applied Sciences, 2021, 11, 6698, 18 pgs., <https://doi.org/10.3390/app11156698>.

(Continued)

*Primary Examiner* — Debbie M Le
(74) *Attorney, Agent, or Firm* — Nicholas A. Welling (57) ABSTRACT

An approach to time-series data point anomaly detection may be presented. Data point anomalies in time-series data can cause a cascade of incorrect predictions in a time-series data prediction model. Presented herein may be an approach to decompose a time-series training data set into elementary components, such as seasonal, trend and residual. The approach may determine one or more confidence intervals for elementary components of data points including level shift, variance, and outlier. From these confidence intervals, new data points can be analyzed and identified as anomaly data points. The approach may also prevent anomaly data points from being incorporated into a time series data prediction model, reducing prediction error in the prediction model.

20 Claims, 3 Drawing Sheets

(56) References Cited

U.S. PATENT DOCUMENTS

2023/0049099 A1  2/2023  Fotak

OTHER PUBLICATIONS

Schmidl, et al., "Anomaly Detection in Time Series: A Comprehensive Evaluation", Proceedings of the VLDB Endowment, vol. 15, Issue 9, 19 pgs., May 1, 2022, doi:10.14778/3538598.3538602.
Xu, et al., "Semi-supervised Variational Temporal Convolutional Network for IoT Communication Multi-anomaly Detection", Apr. 5, 2021, 9 pgs.,<https://arxiv.org/abs/2104.01813>.
Zhao, et al., "Exploratory Analysis of Time-series with ChronoLenses", IEEE Transactions on Visualization and Computer Graphics, vol. 17, No. 12, Dec. 2011, 10 pgs.
International Searching Authority, "Notification of Transmittal of the International Search Report and the Written Opinion of the International Searching Authority, or Declaration," Patent Cooperation Treaty, Feb. 21, 2025, 16 pages, International Application No.-PCT/ EP2024/083541.

\* cited by examiner

OPTIMIZATION OF TIME-SERIES ANOMALY DETECTION

BACKGROUND

The present invention relates to artificial intelligence and machine learning, and more specifically, to time-series data anomaly detection.

A time-series data set are points of some value arranged in chronological order. The data point is comprised of the independent variable which is the time variable and the dependent variable which is the phenomenon being measured. Sensors (e.g., internet of things, etc.) or similar measuring devices typically produce a data sequence or time-series data. Time-series data can also come from financial markets, crop or husbandry yields, sun exposure, electrical usage, network traffic and even wildlife populations. When sensors operate properly, the variation in data points are generally within an expected range.

In its simplest terms time series prediction is a task where an initial set of elements in a series is provided and the number of future elements in the series are predicted based on the initial set. Time series forecasting occurs when you make scientific predictions based on historical time stamped data. Involves building models through historical analysis and using them to make observations and drive future strategic decision-making.

SUMMARY

According to an embodiment of the present invention, a computer implemented method for anomaly adjustment in time-series prediction models may be disclosed. The computer-implemented method comprising decomposing a time series data into a residual component, a trend component, and a seasonal component. Segmenting the residual component and the trend component, based on a time value. Classifying a first data point of the time-series data as an anomaly. Determining whether the first data point is inside of an outlier confidence interval range. Responsive to a determination the first data point is inside the outlier confidence interval, label the first data point as a non-outlier. Determining whether the first data point is inside of a level shift confidence interval range for the same residual segment as the first data point. Responsive to a number of non-outlier data points being labeled as non-outliers is above a threshold value, calculating a mean difference between a first trend segment corresponding to the residual segment containing the first data point, and a second trend segment which immediately precedes it. Determining whether the mean difference between the first trend segment and the second trend segment is within a level shift confidence interval range. Responsive to the mean difference being within the level shift confidence interval range, computing the variance difference between the first trend segment and the second trend segment. Determining whether the variance difference is within a variance confidence interval range. Responsive to determining the variance difference is within a variance confidence interval range, removing the anomaly classification of the first data point. Embodiments of the invention may have an advantage of preventing outlier time-series data points from causing errors in the prediction of future data points due to data drift or other machine learning data issues.

The computer-implemented method for anomaly adjustment in time-series prediction models, further comprising predicting one or more time-series data points for the time-series data, based at least in part on the first data point, wherein the anomaly classification of the first data point has been removed.

The computer-implemented method for anomaly adjustment in time-series prediction models, further comprising training a semi-supervised anomaly detection model, wherein the anomaly detection model is based on trait exploration of a historical time-series training data.

The computer-implemented method for anomaly adjustment in time-series prediction models, further comprising decomposing, a historical-time series data, into the historical residual component. Segmenting the historical residual component. Computing a mean value for each of the historical residual component segments. Finding a difference between each mean value of adjacent historical residual component; segments. Computing a mean difference, based on the difference between each mean value of adjacent historical residual component segments. Computing a standard deviation, based on the mean difference. Generating an outlier confidence interval, wherein a maximum of the outlier confidence interval is the mean difference plus the standard deviation times a threshold and the minimum of the outlier confidence interval is the mean difference minus the standard deviation times the threshold.

The computer-implemented method for anomaly adjustment in time-series prediction models, further comprising decomposing, a historical-time series data, into the historical trend component. Segmenting the historical trend component. Computing a mean value for each of the historical trend component segments. Finding a difference between each mean value of adjacent historical trend component segments. Computing a mean difference, based on the difference between each mean value of adjacent historical trend component segments. Computing a standard deviation, based on the mean difference. Generating a level shift interval, wherein a maximum of the level shift interval is the mean difference plus the standard deviation times a threshold and the minimum of the level shift interval is the mean difference minus the standard deviation times the threshold.

The computer-implemented method for anomaly adjustment in time-series prediction models, further comprising, further comprising decomposing, a historical-time series data, into the historical residual component. Segmenting the historical residual component. Computing a variance for each of the historical residual component segments.

Finding a difference between each variance of adjacent historical residual component; segments. Computing a mean variance difference, based on the difference between each mean value of adjacent historical residual component segments. Computing a standard deviation, based on the mean variance difference. Generating a variance confidence interval, wherein a maximum of the variance confidence interval is the mean difference plus the standard deviation times a threshold and the minimum of the variance confidence interval is the mean difference minus the standard deviation times the threshold.

The computer-implemented method for anomaly adjustment in time-series prediction models, where in the time-series data is associated with electricity generation.

According to another embodiment of the present invention, a computer system for anomaly adjustment in time-series prediction models may be disclosed. The computer system may comprise a processor, a computer-readable memory, and a computer readable tangible storage device and program instructions stored on the computer-readable storage device for execution by a processor via the computer-readable memory, wherein the computer system is configured to perform a method. The method may comprise decomposing a time series data into a residual component, a trend component, and a seasonal component. Segmenting the residual component and the trend component, based on a time value. Classifying a first data point of the time-series data as an anomaly. Determining whether the first data point is inside of an outlier confidence interval range. Responsive to a determination the first data point is inside the outlier confidence interval, label the first data point as a non-outlier. Determining whether the first data point is inside of a level shift confidence interval range for the same residual segment as the first data point. Responsive to a number of non-outlier data points being labeled as non-outliers is above a threshold value, calculating a mean difference between a first trend segment corresponding to the residual segment containing the first data point, and a second trend segment which immediately precedes it. Determining whether the mean difference between the first trend segment and the second trend segment is within a level shift confidence interval range. Responsive to the mean difference being within the level shift confidence interval range, computing the variance difference between the first trend segment and the second trend segment. Determining whether the variance difference is within a variance confidence interval range. Responsive to determining the variance difference is within a variance confidence interval range, removing the anomaly classification of the first data point. Embodiments of the invention may have an advantage of preventing outlier time-series data points from causing errors in the prediction of future data points due to data drift or other machine learning data issues.

According to yet another embodiment of the present invention, a computer program product for anomaly adjustment in time-series prediction models may be disclosed. The computer program product may comprise a computer readable storage device having program instructions embodied therewith, wherein an execution of the program instructions by a computer processor causes a computing device to perform a method. The method may comprise decomposing a time series data into a residual component, a trend component, and a seasonal component. Segmenting the residual component and the trend component, based on a time value. Classifying a first data point of the time-series data as an anomaly. Determining whether the first data point is inside of an outlier confidence interval range. Responsive to a determination the first data point is inside the outlier confidence interval, label the first data point as a non-outlier. Determining whether the first data point is inside of a level shift confidence interval range for the same residual segment as the first data point. Responsive to a number of non-outlier data points being labeled as non-outliers is above a threshold value, calculating a mean difference between a first trend segment corresponding to the residual segment containing the first data point, and a second trend segment which immediately precedes it. Determining whether the mean difference between the first trend segment and the second trend segment is within a level shift confidence interval range. Responsive to the mean difference being within the level shift confidence interval range, computing the variance difference between the first trend segment and the second trend segment. Determining whether the variance difference is within a variance confidence interval range. Responsive to determining the variance difference is within a variance confidence interval range, removing the anomaly classification of the first data point. Embodiments of the invention may have an advantage of preventing outlier time-series data points from causing errors in the prediction of future data points due to data drift or other machine learning data issues.

DETAILED DESCRIPTION

In time-series data prediction models, anomaly detection of incoming data points is an important activity. Training of a time-series prediction model can be a semi-supervised task. The time-series prediction model can quickly determine if it is abnormal when a new input is received, based on the prior historical data and the time at which the new input corresponds. However, upon receiving this abnormal data point the entire model is then adjusted based on the abnormal data point. Thus, future data points predicted by the model, based on the abnormal data point, are then more likely to be abnormal and trigger false positives, until more data points are received to correct the initial abnormal data point. Embodiments of the present invention recognize the advantages of a time-series prediction model determining if a received data point is an abnormal data point. Further, in time-series data prediction, immediate prediction in response to an incoming data point is not typically necessary, thus allowing for a determination of whether the predictions based on the data point are likely to trigger a cascade of false positives.

In an embodiment, a time-series model prediction result can be adjusted to provide a more accurate and trustworthy result, resistant to abnormal or outlier data points. The embodiment can train a semi-supervised anomaly detection model trained with historical time-series data and analyze the training data, thus exploiting traits and through decomposing the training data into a trend component, a seasonal component, and a residual component. The components may be analyzed to generate one or more confidence intervals for different abnormal data points, based on the time-series data explored traits. Upon the time-series model receiving abnormal time-series data as, the generated predictions can be compared against the confidence interval to determine if the generated predictions are false-positives.

In an embodiment, a time-series decomposition can obtain the trend component, the seasonal component, and the residual component. In the time-series decomposition, a time-series ($X_t$) of length n can be decomposed in the following manner, $$X_t = TC_t + S_t + I_t$$

where $TC_t$ is the trend cycle component, $S_t$ is the seasonal component, and $I_t$ is the residual component.

The trend component can be obtained by centering a moving average ($X_t$), based on a moving window size (l). The method to generate the trend component depends on whether l is even or odd. If l is even, then the trend component can be generated as follows:

$$TC_t = \left\{ \frac{X_{t-l/2} + X_{t+l/2}}{2l} + \frac{1}{l}\left(\sum_{j=t-[l/2]}^{t+l/2-1} X_j\right) \right\}, t = \frac{l}{2}+1, \ldots, n-\frac{l}{2};$$

If l is odd the trend component can be generated as follows:

$$TC_t = \left\{ \frac{1}{l}\left(\sum_{j=t-[l/2]}^{t+[l/2]} X_j\right) \right\}, t = \left|\frac{l}{2}\right|+1, \ldots, n-\left|\frac{l}{2}\right|;$$

where |x| is the largest integer that is not greater than x. In an embodiment, the window size (l) can be specified. However, if the window size is not specified, the default rules may be utilized, where if the period of seasonality is s>1 and n≥3s, then l=s and if s=1, but n≥3s, then l=3 for 6≤n≤10, and l=5 for n>10.

In an embodiment, the seasonal-irregular component can be obtained in the following manner:

$$SI_t = X_t - TC_t$$

further, the seasonal component can be obtained by averaging the seasonal-irregular component for each season:

$$S_{k+js} = \frac{\sum_{t \equiv k(mods)} SI_t}{\text{the number of nonmissing in the summation}}$$

where k=1, 2, ..., s, j is non-negative integer such that 1≤k+js≤n, where t≡k (mod s) means that t and k have the same remainder after division by s. Therefore, the adjusted seasonal component will be $$AdjS_t = S_t - \frac{\sum_{j=1}^{s} S_j}{s}, t = 1, 2, \ldots, n$$

and the seasonal factors are defined as: $SF_k = AdjS_t$ and k=1, 2, ..., s.

In an embodiment, if s>1 and n≥3s, the residual component can be obtained via $$I_t = SI_t - AdjS_t$$

if s=1, but n≥3s, the residual component can be obtained via, $$I_t = X_t - TC_t$$

In an embodiment, the trend component can be utilized to generate a confidence interval for a level shift. The trend cycle component can be segmented into multiple segments, which corresponding to one or more data points within a given time series. A mean value can be found from the data points within for each segment. The a difference can be found between the mean values of each segment against the adjacent segments. Using the differences of the mean values the standard deviation of the mean differences can be calculated. The confidence interval can be generated based on the mean value and the standard deviation. In one embodiment the mean difference can be found via $$\text{Mean}_{diff} = \sum_{i=1}^{n-1} \frac{Diff_i}{(n-1)}$$

in an embodiment, the standard deviation of the difference can be found via $$sd(diff) = \frac{\sum_{i=1}^{n-1}(diff_i - \text{mean}_{diff})^2}{(n-2)}$$

using the standard deviation a confidence interval can be determined where the range of the interval is provided by [$\text{Mean}_{diff}$–Csd(diff), $\text{Mean}_{diff}$+Csd(diff)], where C is a threshold value (e.g., 0.1 to 0.5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
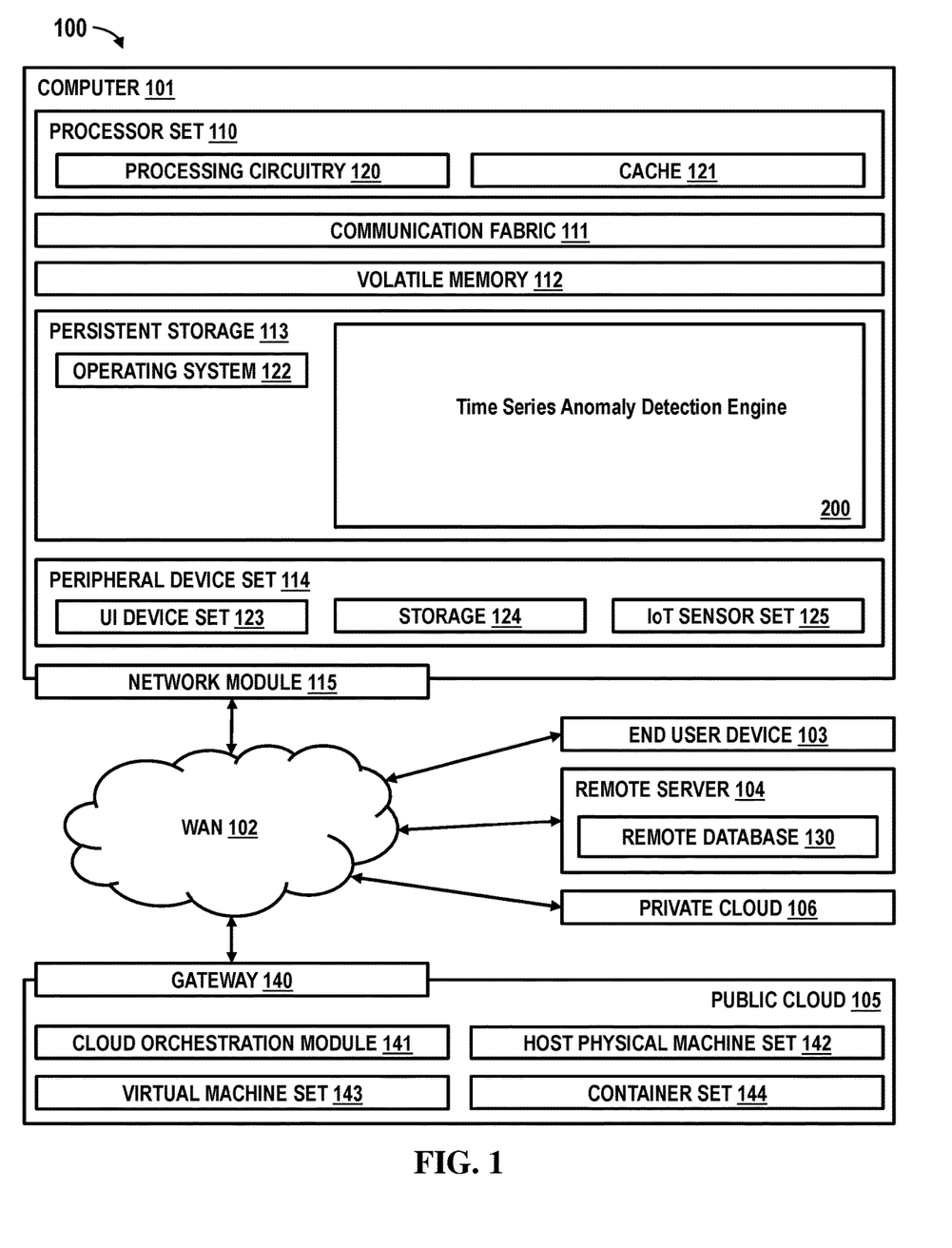
FIG. 1 is a block diagram depicting an exemplary computing environment, in accordance with an embodiment of the invention.

Now with reference to FIG. 1. FIG. 1 depicts Computing environment 100. Computing environment 100 contains an example of an environment for the execution of at least some of the computer code involved in performing the inventive methods, such as time series anomaly detection engine 200. In addition to time series anomaly detection engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and time series anomaly detection engine 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in time series anomaly detection engine 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
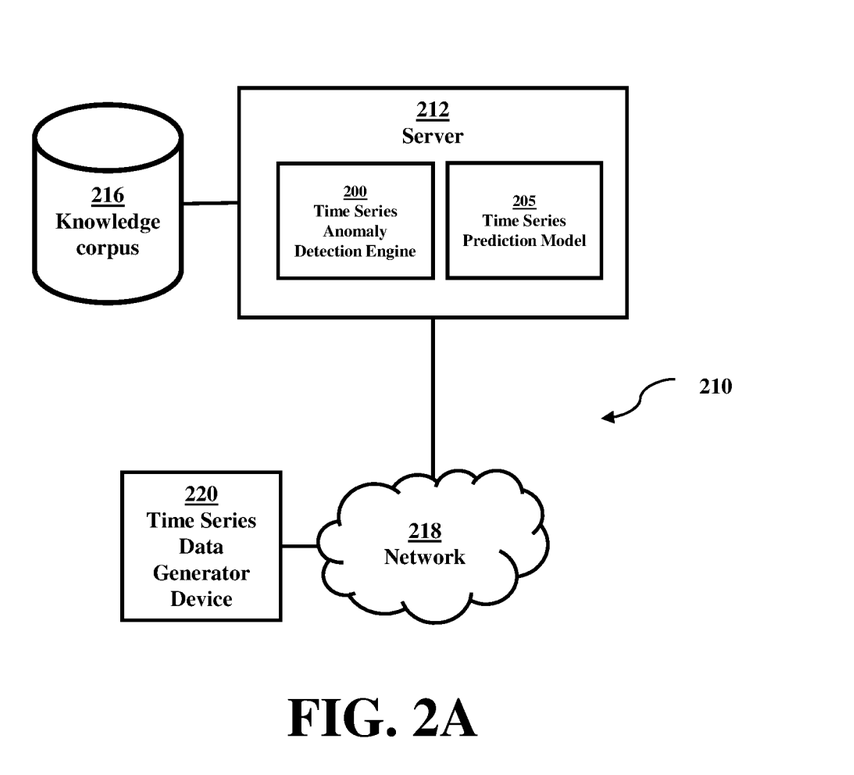
FIG. 2A is a block diagram depicting time series anomaly detection system 210, in accordance with an embodiment of the invention.

With reference now to FIG. 2. FIG. 2 is a block diagram of time series anomaly detection system 210 in accordance with an embodiment of the invention. Shown in time series anomaly detection system 210 is server 212. Operational on server 212 is time series anomaly detection engine 200 and time series prediction model 205. Knowledge corpus 216 is shown stored on server 212. Also shown in time series anomaly detection system 210 is network 218, time series data generator device 220. Server 212 is shown in communication with time series data generator device 220 via network 212 but may also be directly connected to server 212.

Time series prediction model 205 is a computer model which can predict future data points in a time series. This is also known as forecasting. In an embodiment, time series prediction module 205 can be an artificial intelligence or machine learning model trained with one or more historical data sets of time series data points. Time series prediction model 205 can be trained in a semi-supervised manner without anomalies to accurately learn the expected behavior of the time series data. In an embodiment, time series prediction model 205 can predict one or more (e.g., 2, 3, n . . . n+1) future data points for real time received time series. In an embodiment, time series prediction model 205 utilizes a sliding window with a stride of one time segment. This allows time series prediction model 205 to build a context window and predict or forecast one or more data points in the immediate future. Time series prediction model 205 can be based on a single forecasting method or a combination of forecasting methods, for example, autoregression, moving average, vector autoregression, simple exponential smoothing, and seasonal autoregressive moving average. Time series prediction model 205 can be based on a deep learning design architecture for example, recurrent neural network, long short term memory, multi-layer perceptron. Time series prediction model 205 can also be based on a machine learning model, for example, XGBoost, Random Forest, etc.

Knowledge corpus 216 is a database which can store historical time series data points. In an embodiment, knowledge corpus 216 can incorporate newly received data from time series data generator device 220 into the historical time series data points into a human readable format. Knowledge corpus 216 can be a database or similar data structure which can retain data points or similar information from a device which records time-series events.

Time series data generator device 220 is one or more devices capable of data points in a time based format. For example, time series data generator device 220 may be a thermometer coupled with a clock. In this example, the thermometer may take temperature readings continuously or at predefined intervals. In another example, time series data generator device 220 can be a network traffic monitor capable of monitoring data packets uploaded and downloaded at a specific point in an telecommunications system or within a local area network. In another example, time series data generator may be a program which monitors the frequency and amounts of deposits and withdraws in a financial technology system. In yet another example, time series data generator device 220 may monitor electricity usage associated with an electrical grid. Other examples of time series data generator device 220.

Figure 2B:
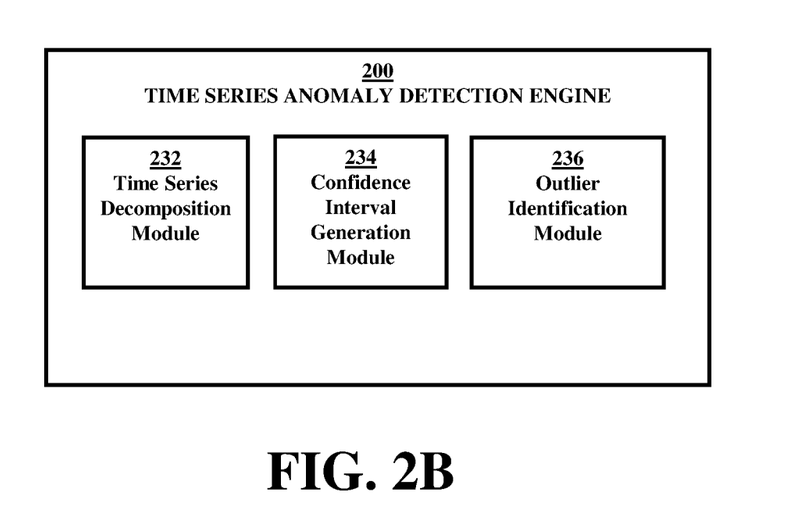
FIG. 2B is a block diagram depicting time series anomaly detection engine 200, in accordance with an embodiment of the invention.

FIG. 2B is a block diagram of time series anomaly detection engine 200, in accordance with an embodiment of the invention. Shown on anomaly detection engine 200 is time series decomposition module 232, confidence interval generation module 234, and outlier modification module 236.

Time series decomposition module 232 is a computer module that can decompose time series data into its elementary components. In an embodiment, time series decomposition module 232 can receive a set of time series data points from a historical data set or real-time series data points from a device such as time series data generator device 220. Time series decomposition module can decompose the time series data points into component parts. The component parts can be a trend cycle component, a seasonal cycle component, and a residual cycle component. A trend component may indicate a general increase, decrease, or static pattern over time or the general long term direction. A seasonal component is related to systematic reoccurring patterns (e.g., temperature is a calendar related movement). A residual component is an unsystematic short term fluctuation in a time series data set.

Confidence interval generation module 234 is a computer module that can generate a confidence interval associated with each elementary component of a time series data set. In an embodiment, confidence interval generation module 234 can receive the output of times series decomposition module 232 (i.e., the trend component, seasonal component, and residual component). A confidence interval can be generated based on intervals associated with the time series data points. For example, confidence interval generation module 234 can generate a confidence interval of a level shift associated with a trend component. In another example, confidence interval generation module 234 can generate a confidence interval of residual values. In another embodiment, confidence interval generation module 234 can generate a confidence interval of variance associated with a residual value.

In an embodiment, confidence interval generation module 234 can generate a confidence interval of an outlier from a residual component. Confidence interval generation module 234 can segment the residual component data points into equal temporal segments. Confidence interval generation module 234 can find the mean value for each individual segment. Confidence interval generation module 234 can find the difference between the mean of each adjacent temporal segment. Confidence interval generation module 234 can find the mean of the differences between adjacent temporal segments and determine a standard deviation. Confidence interval generation module 234 can find a confidence interval of the outlier based on the mean and standard deviation. In an embodiment, the confidence interval can have the mean as the midpoint of the confidence interval plus or minus a multiple of the standard deviation (e.g., 1, 2, n . . . n+1). In another embodiment, the confidence interval can have the mean as the midpoint of the confidence interval plus or minus a constant, times the generated standard deviation. The constant can be predetermined or dynamically determined.

In an embodiment, confidence interval generation module 234 can generate a confidence interval of a level shift from a trend component. Confidence interval generation module 234 can segment the trend component data points into equal temporal segments. Confidence interval generation module 234 can find the mean value for each individual segment. Confidence interval generation module 234 can find the difference between the mean of each adjacent temporal segment. Confidence interval generation module 234 can find the mean of the differences between adjacent temporal segments and determine a standard deviation. Confidence interval generation module 234 can find a confidence interval of the outlier based on the mean and standard deviation. In an embodiment, the confidence interval can have the mean as the midpoint of the confidence interval plus or minus a multiple of the standard deviation (e.g., 1, 2, n . . . n+1). In another embodiment, the confidence interval can have the mean as the midpoint of the confidence interval plus or minus a constant, times the generated standard deviation. The constant can be predetermined or dynamically determined.

In an embodiment, confidence interval generation module 234 can generate a confidence interval of variance from a residual component. Confidence interval generation module 234 can segment the residual component data points into equal temporal segments. Confidence interval generation module 234 can find the variance value for each individual segment. Confidence interval generation module 234 can find the difference between the variance of each adjacent temporal segment. Confidence interval generation module 234 can find the mean of the variance differences between adjacent temporal segments and determine a standard deviation. Confidence interval generation module 234 can find a confidence interval of the outlier based on the mean and standard deviation of the variance differences. In an embodiment, the confidence interval can have the mean as the midpoint of the confidence interval plus or minus a multiple of the standard deviation (e.g., 1, 2, n . . . n+1). In another embodiment, the confidence interval can have the mean as the midpoint of the confidence interval plus or minus a constant, times the generated standard deviation. The constant can be predetermined or dynamically determined.

Outlier identification module 236 is a computer module that can identify outlier data points in time series data. In an embodiment, outlier identification module 236 can receive, as input, a confidence interval value generated by confidence interval generation module 234 and a time series data point components of real-time time series data decomposed by time series decomposition module 236. Outlier identification module 236 can analyze a decomposed real-time data point component in comparison to a confidence interval (e.g., a level shift, variance, and outlier). If outlier identification module 236 determines the decomposed real time data point is outside of one or more of the confidence intervals, outlier identification module 236 will identify or tag that data point as an anomaly. The type of anomaly corresponds to the confidence interval which the data point does not fall within. For example, the tags can be level shift, variance, and/or outlier.

Upon identifying or tagging the data point as an anomaly, outlier identification module 236 can signal or cause time series prediction model to ignore the data point in its prediction or forecasting consideration. In an embodiment, outlier identification module 236 may send the expected mean value to for the data point at that time to prevent time series prediction model from basing its future predictions on an anomaly data point. In an embodiment, outlier identification module can keep a running list of identified anomaly data points. If multiple anomaly data points are detected in succession, outlier identification module 236 can send the identified anomaly data points to time series prediction model 205 with instructions to include the data points in its predictions to prevent incorrect predictions or drift.

Figure 3:
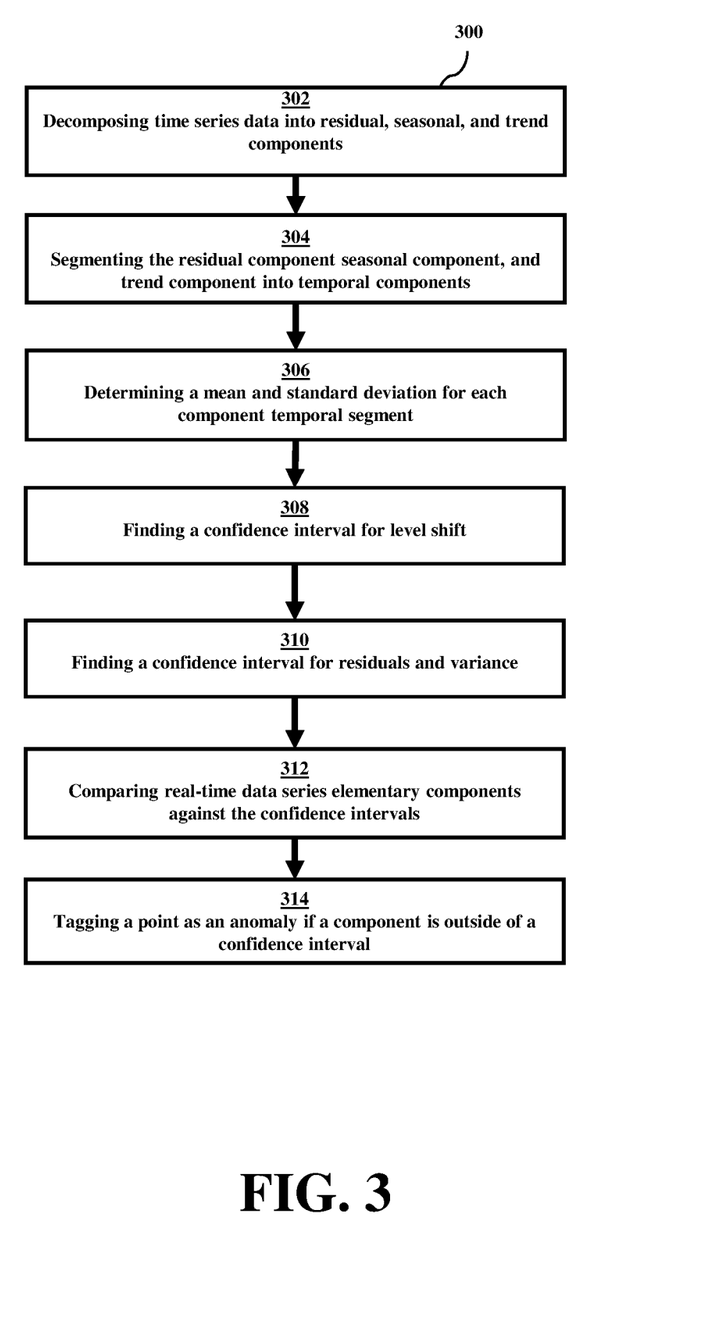
FIG. 3 is a block diagram depicting a method for time series anomaly detection 300, in accordance with an embodiment of the invention.

With reference now to FIG. 3. FIG. 3 is flowchart 300 depicting the steps of time series data anomaly detection. At step 302, Decomposing time-series data into a residual, seasonal, and a trend component. At step 304, segmenting the residual component and the trend component into equal temporal components. At step 306, determining a mean for each temporal segment and a standard deviation for the difference of the mean between each adjacent temporal segment for the residual component and trend component. At step 308, finding a confidence interval for level shift based on the mean and standard deviation trend component. At step 310, finding a confidence interval for outlier and a confidence interval for variance based on the mean and standard deviation residual component. At step 312, compare the elementary components of a real-time data series point against the corresponding confidence intervals. At step 314, responsive to an elementary component being outside a confidence interval, tagging the data point as an anomaly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for anomaly adjustment in time-series prediction models comprising:
   decomposing a time series data into a residual component, a trend component, and a seasonal component;
   segmenting the residual component and the trend component, based on a time value;
   classifying a first data point of the time-series data as an anomaly;
   determining whether the first data point is inside of an outlier confidence interval range,
      responsive to a determination the first data point is inside the outlier confidence interval label the first data point as a non-outlier;
   determining whether the first data point is inside of a level shift confidence interval range for the same residual segment as the first data point;
   responsive to a number of non-outlier data points being labeled as non-outliers is above a threshold value calculating a mean difference between a first trend segment corresponding to the residual segment containing the first data point, and a second trend segment which immediately precedes it;
   determining whether the mean difference between the first trend segment and the second trend segment is within a level shift confidence interval range;
      responsive to the mean difference being within the level shift confidence interval range computing the variance difference between the first trend segment and the second trend segment;
      determining whether the variance difference is within a variance confidence interval range;
      responsive to determining the variance difference is within a variance confidence interval range removing the anomaly classification of the first data point.

2. The computer-implemented method of claim 1, further comprising:
   predicting one or more time-series data points for the time-series data, based at least in part on the first data point, wherein the anomaly classification of the first data point has been removed.

3. The computer-implemented method of claim 1, further comprising:
   training a semi-supervised anomaly detection model, wherein the anomaly detection model is based on trait exploration of a historical time-series training data.

4. The computer-implemented method of claim 3, further comprising:
  decomposing a historical-time series data, into the historical residual component;
  segmenting the historical residual component;
  computing a mean value for each of the historical residual component segments;
  finding a difference between each mean value of adjacent historical residual component; segments;
  computing a mean difference, based on the difference between each mean value of adjacent historical residual component segments;
  computing a standard deviation, based on the mean difference;
  generating an outlier confidence interval, wherein a maximum of the outlier confidence interval is the mean difference plus the standard deviation times a threshold and the minimum of the outlier confidence interval is the mean difference minus the standard deviation times the threshold.

5. The computer-implemented method of claim 3, further comprising:
  decomposing a historical-time series data, into the historical trend component;
  segmenting the historical trend component;
  computing a mean value for each of the historical trend component segments;
  finding a difference between each mean value of adjacent historical trend component; segments;
  computing a mean difference, based on the difference between each mean value of adjacent historical trend component segments;
  computing a standard deviation, based on the mean difference; and
  generating a level shift interval, wherein a maximum of the level shift interval is the mean difference plus the standard deviation times a threshold and the minimum of the level shift interval is the mean difference minus the standard deviation times the threshold.

6. The computer-implemented method of claim 3, further comprising:
  decomposing a historical-time series data, into the historical residual component;
  segmenting the historical residual component;
  computing a variance for each of the historical residual component segments;
  finding a difference between each variance of adjacent historical residual component; segments;
  computing a mean variance difference, based on the difference between each mean value of adjacent historical residual component segments;
  computing a standard deviation, based on the mean variance difference;
  generating a variance confidence interval, wherein a maximum of the variance confidence interval is the mean difference plus the standard deviation times a threshold and the minimum of the variance confidence interval is the mean difference minus the standard deviation times the threshold.

7. The computer-implemented method of claim 1, wherein the time-series data is associated with electricity generation.

8. A computer system for anomaly adjustment in time-series prediction models comprising:
  a processor,
  a computer-readable memory,
  a computer-readable tangible storage device, and program instructions stored on the computer-readable storage device for execution by a processor via the computer-readable memory, wherein the computer system is configured to perform one or more operations, comprising operations to:
    decompose a time series data into a residual component, a trend component, and a seasonal component;
    segment the residual component and the trend component, based on a time value;
    classify a first data point of the time-series data as an anomaly;
    determine whether the first data point is inside of an outlier confidence interval range,
      responsive to a determination the first data point is inside the outlier confidence interval label the first data point as a non-outlier;
    determine whether the first data point is inside of a level shift confidence interval range for the same residual segment as the first data point;
    responsive to a number of non-outlier data points being labeled as non-outliers is above a threshold value a mean difference between a first trend segment corresponding to the residual segment containing the first data point, and a second trend segment which immediately precedes it;
    determine whether the mean difference between the first trend segment and the second trend segment is within a level shift confidence interval range;
      responsive to the mean difference being within the level shift confidence interval range compute the variance difference between the first trend segment and the second trend segment;
    determine whether the variance difference is within a variance confidence interval range;
    responsive to a determination the variance difference is within a variance confidence interval range, remove the anomaly classification of the first data point.

9. The computer system of claim 8, comprising program instructions stored on the computer-readable storage device for execution by the processor via the computer-readable memory, wherein the computer system is configured to perform the method, further comprising:
  predict one or more time-series data points for the time-series data, based at least in part on the first data point, wherein the anomaly classification of the first data point has been removed.

10. The computer system of claim 8, comprising program instructions stored on the computer-readable storage device for execution by the processor via the computer-readable memory, wherein the computer system is configured to perform the method, further comprising:
  train a semi-supervised anomaly detection model, wherein the anomaly detection model is based on trait exploration of a historical time-series training data.

11. The computer system of claim 10, comprising program instructions stored on the computer-readable storage device for execution by the processor via the computer-readable memory, wherein the computer system is configured to perform the method, further comprising:
  decompose a historical-time series data, into the historical residual component;

segment the historical residual component;
compute a mean value for each of the historical residual component segments;
find a difference between each mean value of adjacent historical residual component; segments;
compute a mean difference, based on the difference between each mean value of adjacent historical residual component segments;
compute a standard deviation, based on the mean difference;
generate an outlier confidence interval, wherein a maximum of the outlier confidence interval is the mean difference plus the standard deviation times a threshold and the minimum of the outlier confidence interval is the mean difference minus the standard deviation times the threshold.

12. The computer system of claim 10, comprising program instructions stored on the computer-readable storage device for execution by the processor via the computer-readable memory, wherein the computer system is configured to perform the method, further comprising:
decompose a historical-time series data, into the historical trend component;
segment the historical trend component;
compute a mean value for each of the historical trend component segments;
find a difference between each mean value of adjacent historical trend component; segments;
compute a mean difference, based on the difference between each mean value of adjacent historical trend component segments;
compute a standard deviation, based on the mean difference; and
generate a level shift interval, wherein a maximum of the level shift interval is the mean difference plus the standard deviation times a threshold and the minimum of the level shift interval is the mean difference minus the standard deviation times the threshold.

13. The computer system of claim 10, comprising program instructions stored on the computer-readable storage device for execution by the processor via the computer-readable memory, wherein the computer system is configured to perform the method, further comprising:
decompose a historical-time series data, into the historical residual component;
segment the historical residual component;
compute a variance for each of the historical residual component segments;
find a difference between each variance of adjacent historical residual component;
segments;
compute a mean variance difference, based on the difference between each mean value of adjacent historical residual component segments;
compute a standard deviation, based on the mean variance difference;
generate a variance confidence interval, wherein a maximum of the variance confidence interval is the mean difference plus the standard deviation times a threshold and the minimum of the variance confidence interval is the mean difference minus the standard deviation times the threshold.

14. The computer system of claim 8, wherein the time-series data is associated with electricity generation.

15. A computer program product for anomaly adjustment in time-series prediction models, the computer program product comprising a computer readable storage medium having program instructions embodied therewith, wherein the program instructions are executable by a computer processor, the program instructions comprising:
program instructions to decompose a time series data into a residual component, a trend component, and a seasonal component;
program instructions to segment the residual component and the trend component, based on a time value;
program instructions to classify a first data point of the time-series data as an anomaly;
program instructions to determine whether the first data point is inside of an outlier confidence interval range, responsive to a determination the first data point is inside the outlier confidence interval program instructions to label the first data point as a non-outlier;
program instructions to determine whether the first data point is inside of a level shift confidence interval range for the same residual segment as the first data point;
responsive to a number of non-outlier data points being labeled as non-outliers is above a threshold value program instructions to calculate a mean difference between a first trend segment corresponding to the residual segment containing the first data point, and a second trend segment which immediately precedes it;
program instructions to determine whether the mean difference between the first trend segment and the second trend segment is within a level shift confidence interval range;
responsive to the mean difference being within the level shift confidence interval range program instructions to compute the variance difference between the first trend segment and the second trend segment;
program instructions to determine whether the variance difference is within a variance confidence interval range;
responsive to a determination the variance difference is within a variance confidence interval range program instructions to removing the anomaly classification of the first data point.

16. The computer program product of claim 15, wherein the execution of the program instructions further causes the computing device to:
predicting program instructions to label one or more time-series data points for the time-series data, based at least in part on the first data point, wherein the anomaly classification of the first data point has been removed.

17. The computer program product of claim 15, wherein the execution of the program instructions further causes the computing device to:
program instructions to train a semi-supervised anomaly detection model, wherein the anomaly detection model is based on trait exploration of a historical time-series training data.

18. The computer program product of claim 17, wherein the execution of the program instructions further causes the computing device to:
program instructions to decompose a historical-time series data, into the historical residual component;
program instructions to segment the historical residual component;
program instructions to compute a mean value for each of the historical residual component segments;
program instructions to find a difference between each mean value of adjacent historical residual component; segments;

program instructions to compute a mean difference, based on the difference between each mean value of adjacent historical residual component segments;

program instructions to compute a standard deviation, based on the mean difference;

program instructions to generate an outlier confidence interval, wherein a maximum of the outlier confidence interval is the mean difference plus the standard deviation times a threshold and the minimum of the outlier confidence interval is the mean difference minus the standard deviation times the threshold.

19. The computer program product of claim 17, wherein the execution of the program instructions further causes the computing device to:

program instructions to decompose a historical-time series data, into the historical trend component;

program instructions to segment the historical trend component;

program instructions to compute a mean value for each of the historical trend component segments;

program instructions to find a difference between each mean value of adjacent historical trend component; segments;

program instructions to compute a mean difference, based on the difference between each mean value of adjacent historical trend component segments;

program instructions to compute a standard deviation, based on the mean difference; and program instructions to generate a level shift interval, wherein a maximum of the level shift interval is the mean difference plus the standard deviation times a threshold and the minimum of the level shift interval is the mean difference minus the standard deviation times the threshold.

20. The computer program product of claim 17, wherein the execution of the program instructions further causes the computing device to:

program instructions to decompose a historical-time series data, into the historical residual component;

program instructions to segment the historical residual component;

program instructions to compute a variance for each of the historical residual component segments;

program instructions to find a difference between each variance of adjacent historical residual component; segments;

program instructions to compute a mean variance difference, based on the difference between each mean value of adjacent historical residual component segments;

program instructions to compute a standard deviation, based on the mean variance difference;

program instructions to generate a variance confidence interval, wherein a maximum of the variance confidence interval is the mean difference plus the standard deviation times a threshold and the minimum of the variance confidence interval is the mean difference minus the standard deviation times the threshold.

* * * * *